United States Patent
Hallwirth

Patent Number: 5,864,479
Date of Patent: Jan. 26, 1999

[54] PROGRAMMING DEVICE FOR PROGRAMMING STATE CONTROLLERS

[75] Inventor: Volker Hallwirth, St. Georgen, Germany

[73] Assignee: Siemens Aktiengesellschaft, München, Germany

[21] Appl. No.: 737,854

[22] Filed: Feb. 14, 1997

[30] Foreign Application Priority Data

May 27, 1994 [DE] Germany ............... 44 18 623.1

[51] Int. Cl.⁶ ............... G05B 11/01; G05B 15/00; G06F 9/45

[52] U.S. Cl. ............... 364/140.06; 364/141; 364/133; 364/147; 364/146; 395/701; 395/702; 395/703; 395/704; 395/705; 395/706; 395/709; 395/710; 395/708

[58] Field of Search ............... 364/141, 133, 364/147, 146, 140.06; 395/701–710

[56] References Cited

FOREIGN PATENT DOCUMENTS

| | | |
|---|---|---|
| 37 43 438 | 6/1989 | Germany . |
| 42 26 456 | 2/1994 | Germany . |
| 42 35 342 | 4/1994 | Germany . |

OTHER PUBLICATIONS

M. Habel et al.,"Hochsprache Statt Maschinensprache". Oct. 1991. Elektronik, Bd. 40, No. 21.

G. Suss. "Sprachnorm Bringt Steuerung In Schwung" Apr. 20, 1993, Elektronik, Bd. 42, No. 8, pp. 44–48.

H. Berger,"Automatisieren Mit Simatic S5–155U", 1989.

Primary Examiner—Reba I. Elmore
Assistant Examiner—Carolyn T. Baumgardner
Attorney, Agent, or Firm—Kenyon & Kenyon

[57] ABSTRACT

A programming device for programming a programmable state controller. The programming device translates a control task into an automation-unit control program to be executed by the programmable state controller. The programming device simplifies the programming of a programmable state controller by using a structured text with several substructures to formulate the control task.

4 Claims, 5 Drawing Sheets

( INPUT BITS )
Start button  = E 0.0;  //1 = pressed
Full sensor   = E 0.1;  //1 = full
Empty sensor  = E 0.2;  //1 = empty

FIG. 3

( OUTPUT BITS )
Lamp     = A 0.0;  //1 = on
Inflow   = A 0.1;  //1 = open
Heater   = A 0.2;  //1 = on
Outflow  = A 0.3;  //1 = open

FIG. 4

( Internal input signals )
Timer 1   = T1;   //1 = Timer 1 running
Timer 2   = T2;   //1 = Timer 2 running

FIG. 5

FAB, FAE, FAG:
F00= character string does not trigger function

FAA:
F11 = start timer1 (// T1=1); delay time 600 ms

FAC:
F33 = start timer1 (// T1=1); heating duration 5 min

FAD:
F44 = start timer2 (// T2=1); reaction duration 3 min

FAF:
F66 = start timer1 (// T1=1); recovery duration 30 s

FIG. 6

EVA:
Start=Start button=1, Full sensor=0, Empty sensor=1, T1=0, T2=0;

EVB:
Fill begin=Start button=X, Full sensor=0, Empty sensor=1, T1=0, T2=0;

EVC:
Heat begin=Start button=X, Full sensor=1, Empty sensor=0, T1=0, T2=0;

EVD:
Heat end=Start button=X, Full sensor=1, Empty sensor=0, T1=0, T2=0;

EVE:
Empty begin=Start button=X, Full sensor=1, Empty sensor=0, T1=0, T2=0;

EVF:
Empty end=Start button=X, Full sensor=0, Empty sensor=1, T1=0, T2=0;

EVG:
Stop=Start button=X, Full sensor=0, Empty sensor=1, T1=0, T2=0;

-------------------------------------------------------------------

AVA: Lamp_on=Lamp=1, Inflow=0, Heater=0, Outflow=0;
AVB: Inflow_open=Lamp=1, Inflow=1, Heater=0, Outflow=0;
AVC: Heater_on=Lamp=1, Inflow=0, Heater=1, Outflow=0;
AVD: Heater_off=Lamp=1, Inflow=0, Heater=0, Outflow=0;
AVE: Outflow_open=Lamp=1, Inflow=0, Heater=0, Outflow=1;
AVF: Outflow_closed=Lamp=1, Inflow=0, Heater=0, Outflow=0;
AVG: Lamp_off=Lamp=0, Inflow=0, Heater=0, Outflow=0;

FIG. 7

PROGRAMMING DEVICE FOR PROGRAMMING STATE CONTROLLERS

FIELD OF THE INVENTION

The present invention relates to a programming device, particularly for programming a programmable state controller.

BACKGROUND INFORMATION

German Published Patent Application No. 37 43 438 describes a device which effects, according to an instantaneous state and an input vector assignment of digital process input quantities, a transition to a subsequent state and a transfer of new control data to an output stage. Here, a control file is provided that is stored in the device and in which the input quantities or rather the combinations of these input quantities are specified that are relevant to the respective instantaneous state.

In German Published Patent Application No. 42 26 456, a programmable state controller is described that facilitates a state transition from an instantaneous state to a subsequent state for multiple processors.

With such a state controller or rather known device, reaction times to changes in the input data are significantly shortened in comparison to a customary programmable controller that, during control operation, reads out individual statements of the control program, corresponding to processing with a Von Neumann machine, from a memory step by step, interprets them and finally executes the corresponding operations.

From the printed publication "Automatisiern mit SIMATIC S5-155U" [Automation with SIMATIC S5-155U], Hans Berger, 1989, a programming device is known that is provided for translating a control task into a control program for an automation unit. All functions of the control task are programmed or described with a representation type "Statement list", "Function plan" or "Contact plan" ["Ladder diagram"]. The programming device translates the programmed functions regardless of the representation types into a corresponding machine code. This code contains all control functions programmed by the user and is read and interpreted by the automation unit after the code was transferred into the automation unit. With this known programming device, it is only possible to produce a control program for a programmable state controller with considerable programming effort. In the older German patent application P 42 35 342.4, a programming device for a programmable state controller is described. The programming device has a memory in which a control task created with a software tool is stored in the form of an action timing diagram that can be displayed on a display apparatus, the action timing diagram describing input and output signals for a technical process to be controlled in the form of binary and/or analog signals. The action timing diagram is processed by the software tool to create a control program having control and status codes for solving the control task, starting from an instantaneous state, through suitable evaluation of level transitions of the signals, and corresponding input, control and state [status] codes of the control program are created for the state controller. Knowledge of a programming language or the representation types customary in automation engineering for a control task is not necessary.

SUMMARY OF THE INVENTION

An object of the present invention is to specify a programming device for further simplified programming of programmable state controllers.

A structured text used to specify a control task is divided into multiple substructures, each of which is associated with a state. The process states possible according to the requirements of a control task and a so-called start state can be stored preferably for a better program overview in a header information unit. Each substructure has a first keyword with a character string designating a state, which is followed by at least one group of ordered pairs, each of which consists of a keyword and a text string. A first pair has a second keyword and at least one input vector in the form of a character string, which is followed by a second pair that consists of a third keyword and a subsequent state in the form of a further character string. In case it is necessary for solving the control task, the substructures must have a third and fourth pair of which the third pair is provided with a fourth keyword and at least one output vector in the form of a character string and the fourth pair comprises a fifth keyword and at least one function call designated by a character string.

BRIEF DESCRIPTION OF THE DRAWINGS

FIGS. 2 through 7 illustrate an exemplary structured text with associated assignments.

DETAILED DESCRIPTION

Figure 1:
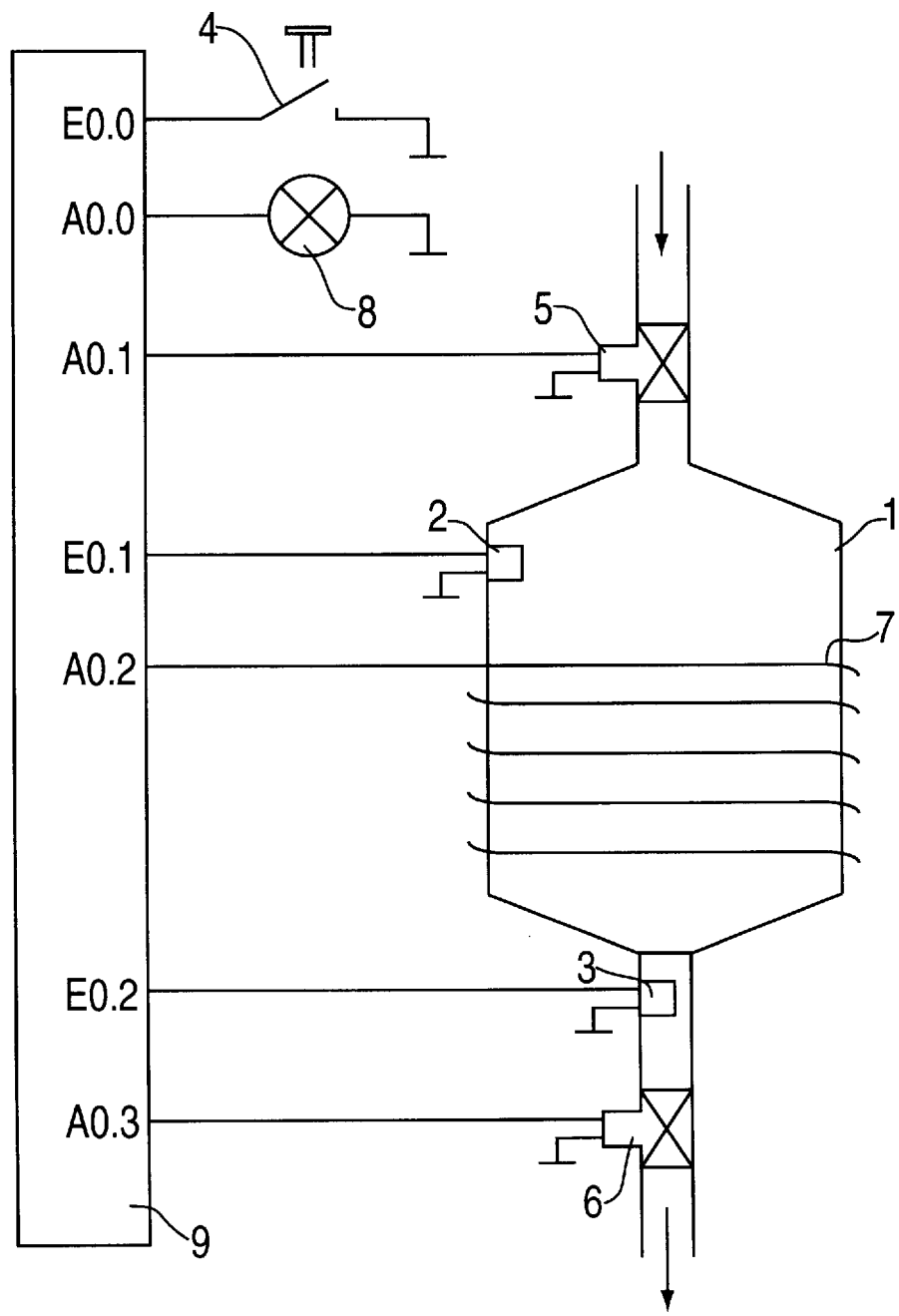
FIG. 1 is a schematic representation of an illustrative system controlled by a programmable state controller.

In FIG. 1, a programmable state controller is designated as 9; it controls a reactor 1 based on input signals E0.0, E0.1 and E0.2. Here, the input signal E0.0 indicates that a reactor cycle is started by a push-button switch 4, and the input signals E0.1, E0.2 generated by sensors 2, 3 indicate whether the reactor is full or empty. An output signal A0.0 is fed to an alarm lamp 8 and indicates the start of the reactor cycle. Output signals A0.1, A0.3 are applied to valves 5, 6 to control the inflow and outflow of a reactor liquid, and an output signal A0.2 causes the heating of the reactor 1 by a heater 7.

A control task now prescribes that a reactor cycle is to be started by the push-button switch 4 and indicated by the alarm lamp 8. 600 milliseconds after the start procedure, the inflow valve 5 of the empty reactor 1 is to be opened; the outflow valve 6 must be closed during a filling procedure. Moreover, the control task prescribes that the inflow valve 5 must be closed if the reactor is full, and that heating energy is to be applied to the liquid in the reactor 1 for the duration of five minutes via the heater 7. Subsequently, a reaction time of three minutes is provided during which the liquid reacts to the application of heat. Once the three minutes elapse, the reactor is to be emptied. For this purpose, the inflow valve 5 remains closed and the outflow valve 6 is opened. If the reactor 1 is empty, the alarm lamp 8 is switched off following a recovery time of 30 seconds and it is indicated in this manner that the reactor cycle is completed and a new cycle can be started.

Figure 2:
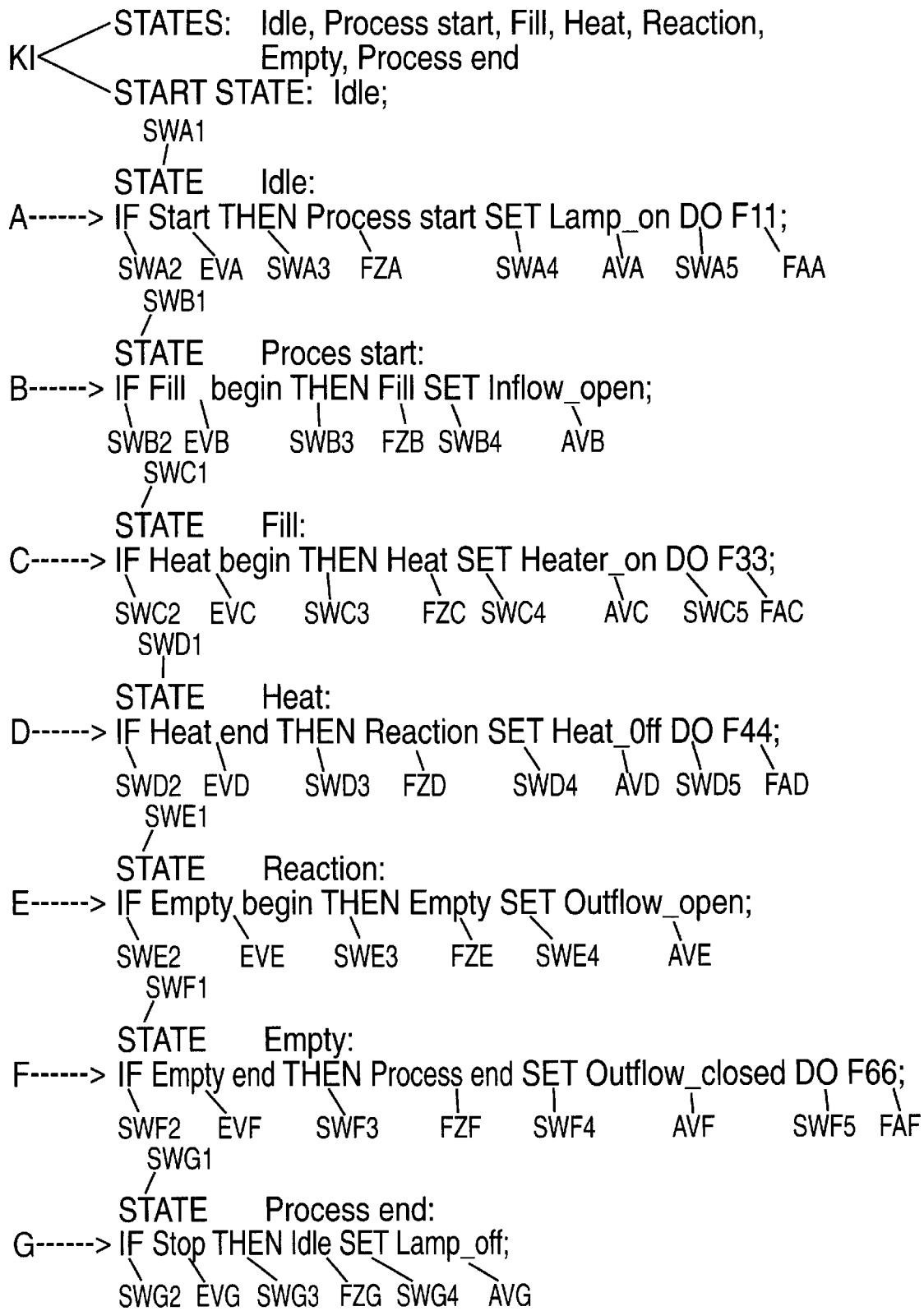

A programmer with a programming device not shown here translates this control task formulated in this manner into a structured text (FIG. 2). The programming device provided with a display apparatus and a memory has for this purpose a software tool that is stored in the memory and also contains statements and commands for displaying the structured text on the display apparatus.

To explain the manner of the further processing, reference will be made initially to FIG. 8. The figure shows a control program in the form of a control table that can also be displayed on the display apparatus, the control table being produced by the software tool from the structured text according to FIG. 2, as will be explained hereafter. Identical parts shown in FIGS. 2 and 3 are given identical reference signs. For greater clarity, the control table is subdivided into blocks $1a \ldots 1g$ of which each block is associated with a state $Z0 \ldots Z6$ and is stored in corresponding memory regions of the memory. $Z0 \ldots Z6$ are the codes for the states "Idle", "Process start", "Fill", "Heat", "Reaction", "Empty" and "Process end"; $e_{ij}$ are input vector assignments that are formed from the binary values of the input signals $E0.0 \ldots$ and internal signals T1, T2 of the state controller 9. $S_{ij}$ are control data vector assignments formed from the binary values of the output signals $A0.0 \ldots$ and function codes $F0 \ldots F6$, where $i=0, 1 \ldots 6$ and $j=0, 1$. Moreover, the character x means that the binary value associated with this character of an input signal $E0.0 \ldots$ is irrelevant, i.e., the corresponding input and control data vector is formed independent of the binary value of this input signal. The character X in the control data vector assignment means that the binary values of the output signals $A0.0 \ldots$ remain unchanged for corresponding input vector assignments.

The further processing of the structured text (FIG. 2) to produce the control program by the software tool is explained in greater detail hereafter.

In the exemplary embodiment, a structured text is divided into seven substructures $A \ldots G$ (FIG. 2), each of which is associated with a state. The states are stored in the form of character strings in a header information unit KI and comprise according to the requirements of the control task (FIG. 1, description) the states "Process start", "Fill" (the reactor), "Heat" (the reactor liquid), "Empty" (the reactor) and "Process end". The "Idle" state is provided as a start state, which is also stored in the header information unit. The substructure A has a first keyword SWA1 in the form of a character string "State" with which a character string "Idle" designating an instantaneous state is associated. This is followed by a group of ordered pairs, each of which consists of a keyword and a character string. A first pair of this group comprises a second keyword SWA2 (character string "IF") and an input vector EVA in the form of a character string "Start". A second pair is adjacent to this input vector EVA and is provided with a third keyword SWA3 (character string "THEN") and a subsequent state FZA designated by a character string "Process start". A third pair after the subsequent state FZA comprises a fourth keyword SWA4 (character string "SET") and an output vector AVA in the form of a character string "Lamp_on". A fourth pair with a fifth keyword SWA5 (character string "DO") and a function call FAA (character string "F11") follows the output vector AVA.

In the same manner corresponding to the requirements of the control task, the substructures $B \ldots G$ are formulated, SWxy (x=B, C, ... G; y=1, 2) meaning the first, second, etc. keywords, EVk and AVk the input and output vectors, FZk the subsequent states and FAk (k=B, C, ... G) the function calls of these substructures B, C, ... G. Here, the programmer takes into account that for the substructures B, E and G, no fifth keyword and no function call are required.

So that the structured text can be translated into a control table (FIG. 8), it is still necessary to specify the input and output vector assignments as well as the binary values of the input and output signals according to the control task. It is stipulated that a pressed start button 4 (FIG. 1) is indicated by a binary value 1 (input signal E0.0=1). Correspondingly, E0.1=1 or rather E0.2=1 mean "The reactor is full or rather empty" (FIG. 3). Moreover, the assignment of the output signals is defined as A0.0=1 in case the lamp 8 is switched on, A0.1=1 in case the inflow valve 5 is open (or rather should be open), A0.2=1 in case the heater 7 is switched on, and A0.3=1 in case the outflow valve 6 is open or rather should be open (FIG. 4). Additionally, in the present example, the function calls in the form of the character strings F00 ... F66 are important as further output quantities, which reproduce the duration of the states according to timer settings of the state controller 9 (FIG. 1). They form internal binary input signals T1, T2 that control, corresponding to the requirements described in the control task, the heating and reaction time as well as the delay times with regard to the opening of the inflow valve 5 and the switching off of the lamp 8. The assignment of the internal input signals T1, T2 and the function calls in the form of the character strings F00 ... F66 is shown in FIGS. 5 and 6. Based on this stipulation and the requirements of the control tasks, the programmer now knows which assignments (levels) of the input and output signals E0.0, E0.1, E0.2 and A0.0, A0.1, A0.2 are relevant and the programmer also knows which subsequent states must be reached upon application of the relevant input signals, starting from an instantaneous state and which output signals must then be output in order to solve the control task. Based on this knowledge, the input and output vectors EVk and AVk (k=A, B, ... G) are to be assigned according to FIG. 7 and finally the substructures $A \ldots G$ formulated according to FIG. 2. Naturally, it is possible to directly enter into the substructures A, B ... G the assignments of the input and output vectors shown in FIG. 6 and FIG. 7 as well as of the character strings F00 ... F66 instead of the character strings (Start, ... , Lamp_on, ... ) for the input and output vectors EVk, AVk as well as for function calls (FAk, ... ). However, for improved program clarity, it is advantageous to enter only the corresponding character strings and to formulate the assignments in a separate list corresponding to FIG. 6 and FIG. 7.

Figure 8:
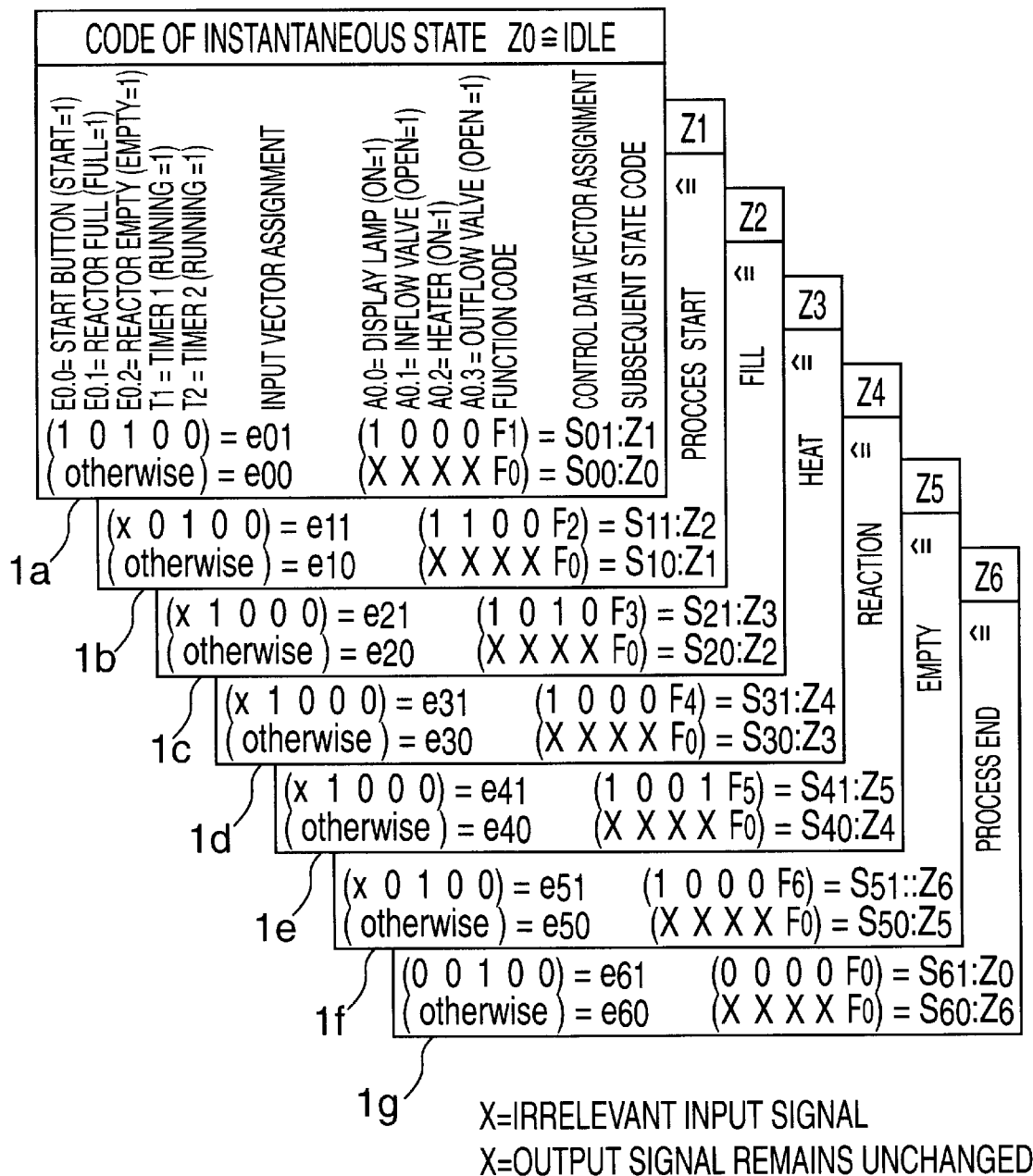
FIG. 8 illustrates a control program for a programmable state controller.

Once the programming of the control task in the form of the described structured text is completed, the software tool produces the control table according to FIG. 8. For this purpose, the software tool first produces from the first keyword SWAL and the first character string "Idle" of the substructure A the associated instantaneous state in coded form Z0 (FIG. 8, region 1a) and finally the input vector assignment in coded form as e01=(10100) from the first ordered pair, consisting of the second keyword SWA2 (character string "IF") and the input vector EVA (character string "Start"), taking into account the assignment of the character string "Start" (FIG. 7), of the binary value requirement [input] of the input and the internal input signals (FIGS. 3 and 5). Based on the second pair, consisting of the first keyword SWA3 (character string "THEN") and character string "Process start", the software tool produces the code Z1 of the subsequent state. From the fourth keyword SWA4 (character string "SET") and output vector AVA (character string "Lamp") as well as from the fifth keyword SWAS (character string "DO") and function call FAA (character string "F11"), the software tool produces, taking into account the assignment of the character string "Lamp_on" (FIG. 7), the character string F11 (FIG. 6) and the binary value requirement [input] of the output signals (FIG. 4), the code for the control vector assignment as S01=(1000F1), F1 representing a function code that is formed from the character string F11. The coding (compilation) of the substructure A of the structured text with regard to a state change from the instantaneous state "Idle" to a subsequent state "Process start" for the case in which the assignment has the form 10100 (=e01) is thus completed (compare region 1a, FIG. 8). In the substructure A, no further character strings are present, which means that for all other possible assignments of the input vector, no state change is provided, and the software tool automatically produces a further code line in the region 1a of the control table, this being an input vector assignment e00 and a control data vector assignment S00, which are associated with a subsequent state code Z0 corresponding to the instantaneous state.

During control operation of the programmable state controller, the described code lines in the region 1a of the control table cause, starting from the instantaneous state "Idle" (code Z0), a change to the subsequent state "Process start" (code Z1) to occur only if the real vector formed from the currently present input signals E0.0, E0.1, E0.2 and the internal signals T1, T2 of the state controller 9 (FIG. 1) has the assignment (10100), i.e., corresponds to the specified input vector assignment e01. Moreover, the control data vector S01=(1000F1) is output only for this case. The controller remains in the instantaneous state "Idle" (represented by the character string "otherwise" in FIG. 8) for all other current input signals. In the same described manner, the software tool produces from the substructures B . . . G the code lines in the regions 1b . . . 1g of the control table. In the substructures B, E and G, in each case a fifth keyword SW5k and a function call FAk (k=B, E, G) are missing. As a result, the software tool produces a function code F0 for the control data vector assignments S11, S41 and S61. This code is of no significance during the control operation of the state controller and does not form a function call that triggers functions.

The control table produced in this manner is transferred into the programmable state controller that, corresponding to the requirements of this table, solves the control task corresponding to that of German Published Patent Application No. 42 26 456 or German Published Patent Application No. 37 43 438. The transfer can be brought about by reading the control table from the memory of the programming device, writing it to a diskette or a memory module and transferring it from there into the user memory of the state controller. Naturally, the transfer can also take place online via a suitable connection of the programming device with the state controller. The software tool is advantageously designed so that even from a specified control table the associated structured text can be produced since all information in the structured text are represented reversibly and unambiguously in the control table.

What is claimed is:

1. A programming device for programming a programmable state controller, the programming device comprising:

a memory for storing a structured text representing a control task, the structured text including a plurality of substructures, each substructure including:
  a first keyword followed by a first character string designating an instantaneous state,
  a second keyword arranged after the first character string and followed by a second character string designating an input vector,
  a third keyword arranged after the second character string and followed by a third character string designating a subsequent state,
  a fourth keyword arranged after the third character string and followed by a fourth character string designating an output vector;

a display for displaying the structured text;

means for generating a control table that is executable by the programmable state controller, the control table including:
  an instantaneous state generated in accordance with the first keyword and the first character string,
  an input vector assignment generated in accordance with the second keyword and the second character string,
  a subsequent state generated in accordance with the third keyword and the third character string, and
  a control data vector assignment generated in accordance with the fourth keyword and the fourth character string.

2. The programming device according to claim 1, wherein:

a fifth keyword is arranged after the fourth character string and is followed by a function call, and the control data vector assignment is supplemented with a function code associated with the function call.

3. The programming device according to claim 1, wherein the structured text includes a header information unit containing possible process states and a start state in the form of character strings.

4. The programming device according to claim 1, wherein the structured text can be restored from the control table.

* * * * *